United States Patent [19]

Lautenschläger

[11] 4,250,820
[45] Feb. 17, 1981

[54] PROCESS AND APPARATUS FOR OPERATING A FIREBOX WITH SOLID GASIFIABLE FUEL HAVING POOR KINDLING PROPERTIES AND LOW VOLATILE GAS CONTENTS

[75] Inventor: Friedrich W. Lautenschläger, Düsseldorf, Fed. Rep. of Germany

[73] Assignee: Vereinigte Kesselwerke AG, Düsseldorf, Fed. Rep. of Germany

[21] Appl. No.: 65,200

[22] Filed: Aug. 9, 1979

[30] Foreign Application Priority Data

Aug. 25, 1978 [DE] Fed. Rep. of Germany ....... 2837174

[51] Int. Cl.³ ................................................ F23D 1/00
[52] U.S. Cl. ..................................... 110/347; 110/265; 110/302; 110/348; 431/10; 431/165; 431/351
[58] Field of Search ............... 110/302, 304, 188, 347, 110/348, 263, 264, 265; 431/10, 351, 353, 165

[56] References Cited

U.S. PATENT DOCUMENTS

| | | | |
|---|---|---|---|
| 2,569,446 | 10/1951 | Bonvillian et al. | 431/351 |
| 2,694,991 | 11/1954 | Marquez | 110/302 |
| 2,971,480 | 2/1961 | Sage | 110/265 |
| 3,190,245 | 6/1965 | Huntington | 110/265 |
| 4,013,399 | 3/1977 | Craig et al. | 431/10 X |
| 4,060,378 | 11/1977 | Peredi | 431/10 X |
| 4,193,773 | 3/1980 | Staudinger | 431/10 X |

FOREIGN PATENT DOCUMENTS 2816674  10/1979  Fed. Rep. of Germany ........... 110/347

*Primary Examiner*—Edward G. Favors
*Attorney, Agent, or Firm*—Michael J. Striker

[57] ABSTRACT

In order to burn a fuel of low ignition properties and low contents of volatile gases in steam generators: the combustion air is introduced in three batches at three successive places into the firebox. Preferably, the primary air is introduced at a temperature of at least about 500°, preferably between 500° and 600° C. so as to effect a pregasification of the fuel. The secondary air is then introduced at a temperature of about 350° to 400° C. to start the combustion of the pregasified fuel and the tertiary air is finally introduced at a temperature of only about 250° to 300° C. in order to complete the combustion. This temperature differentiation of heat ranges then will permit to withdraw theash as a dry discharge.

21 Claims, 3 Drawing Figures

PROCESS AND APPARATUS FOR OPERATING A FIREBOX WITH SOLID GASIFIABLE FUEL HAVING POOR KINDLING PROPERTIES AND LOW VOLATILE GAS CONTENTS

BACKGROUND OF THE INVENTION

This invention relates to a process and apparatus for operating a firebox for steam generators with solid gasifiable fuel, particularly coal dust having poor kindling properties and a low volatile gas contents.

Such fuels having poor kindling properties and a low contents of volatile gases include the so-called anthracites or lean coals, that is coal having a very low contents of volatile gases of about 2 to 8% relative to the crude coal.

Boilers for power plants are known which are operated with lean coal and are provided with one or several molten ash chambers where accordingly a liquid ash discharge occurs. This liquid discharge caused by the necessary higher firebox temperature results in higher formation of nitrous oxides in the flue gas then would occur with a dry ash discharge. If a firebox is used with a dry ash discharge the firing action must be specially stabilized by supporting fire arrangements.

In a prior art process (accepted West German application No. 1,107,876) it has been proposed to burn the dust-like fuel which has poor ignition properties by heating it prior to the entry into the combustion chamber in several stages until the ignition point of the coal dust is reached. As heating medium there can be used flue gases or preheated air which blows the dust into a preheat device. After the preheat stage the coal dust is separated from the preheating medium.

This process requires complex apparatus for heating the coal dust and separating the preheating medium.

It has also become known in apparatus for coal dust firing (West German Pat. Nos. 4 55 571 and 5 51 238) to burn the dust in two stages in which case the dust in the first stage is converted into a more or less gaseous stage. The introduction of a secondary air can be effected at several places of the combustion chamber.

With all of the prior art there has always been the problem that when lean coal is used as fuel for the firing box the poor ignition properties of the coal compared to coal having a higher portion of volatile components require an increase of the temperature of the combustion air if better ignition properties are wanted. Such increase of the temperature of the combustion air however results in an increased formation of the noxious $NO_x$ compounds (nitrous oxides) in the flue gas.

On the other hand, if a lower temperature in the firing box could be obtained it would be possible to get a discharge in the form of a dry ash. Heretofore lean coal could not be properly ignited at lower temperatures and therefore a dry discharge could not be obtained without additional firing means.

The present invention therefore has the general object to provide for a process and apparatus which assures the ignition of fuel of low ignition properties and low contents of volatile gases, such as anthracite lean coal, and nevertheless to effect the combustion at a temperature where a dry discharge is possible and thus the contents of nitrous oxides in the flue gas can be maintained at a low level.

SUMMARY OF THE INVENTION

This object of an improvement of the ignition properties without an increase of the discharge of nitrous oxides is obtained in the invention by employing primary air which comprises about 15 to 20% of the total combustion air and preheating this primary air to a very high temperature. This results in a sufficient preheating assuring a definite ignition without supplemental firing aids.

The balance of the combustion air is introduced at a lower temperature. This is done by adding separately the secondary and tertiary air and providing for a differentiation between their temperatures. The relatively low temperature of the secondary air and of the tertiary air thus results together in a lowering of the overall temperature in the firing box and thus in a decrease of the formation of nitrous oxides without exerting any undesirable action on the ignition process itself.

More specifically, the combustion air is introduced in three batches at three successive places into the firebox. Preferably, the primary air serves as carrier gas for the pulverized fuel. This primary air is introduced at a temperature of at least about 500°, preferably between 500° and 600° C. so as to effect a pregasification of the fuel. The secondary air is then introduced at a temperature of about 350° to 400° C. to start the combustion of the pregasified fuel and the tertiary air is finally introduced at a temperature of only about 250° to 300° C. in order to complete the combustion. This temperature differentiation of heat ranges then will permit to withdraw the ash as a dry discharge.

Preferably the secondary air comprises about 40 to 50% of the total combustion air and the tertiary air comprises about 35 to 40% of the total combustion air.

The introduction of the combustion air thus is effected in three phases for the purposes stated. In the first phase a pregasification of the fuel, which preferably is coal dust, takes place. At the end of the pregasifying phase the ignition is started. In the second phase the combustion of the pregasified coal dust occurs and in this phase the main energy conversion takes place. In the third phase the remaining residue of not yet combusted fuel is subjected to combustion with tertiary air.

Because of the high temperature of the combustion in the first phase, the fuel, in spite of its poor ignition properties and low contents of volatile gases, is definitely ignited without the necessity of a supporting burner arrangement. In the last phase the combustion of the coal dust-air mixture has proceeded to the point where the final combustion temperature is reached and therefore a much lower temperature tertiary air is sufficient for effecting the combustion of the residual matter.

The invention can be carried out for use in single-or multiduct boilers which may be of any conventional design and therefore will not be further discussed herein.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The drawing in a diagrammatic form illustrates different embodiments of an apparatus for operating a firebox with anthracite lean coal by the process of the invention. In all of these cases the air is introduced in three batches at three different places.

Identical parts are referred to in all of these Figures with the same reference letters.

DESCRIPTION OF EMBODIMENTS

Figure 1:
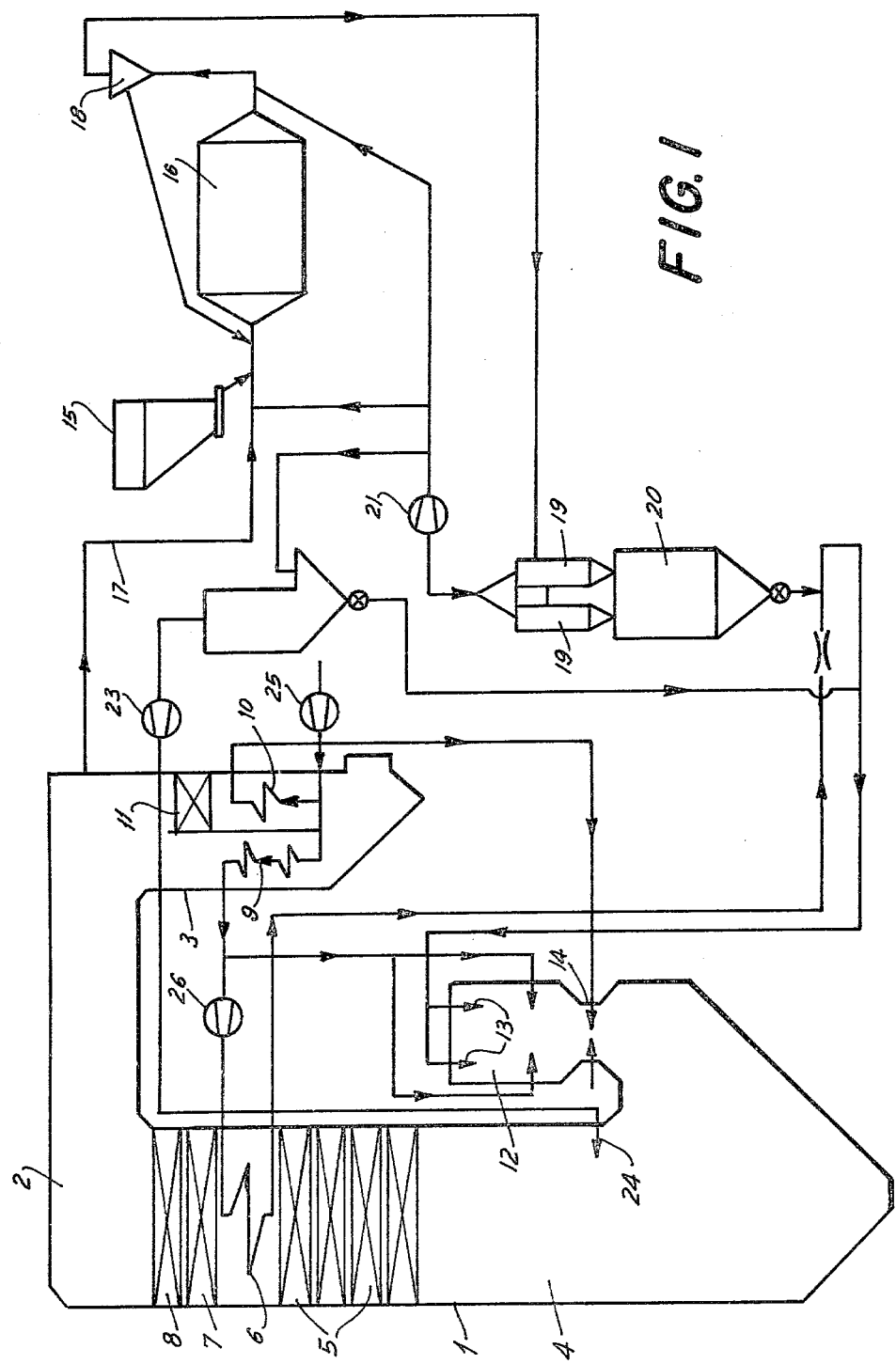
FIG. 1 illustrates an embodiment where the primary air is identical with the carrier air.

With reference to FIG. 1 it will be seen that the steam generator of the invention comprises a first combustion duct 1 which by means of a transverse duct 2 is connected with a second combustion duct portion 3. As already indicated the boiler itself may have a conventional form and the walls of the steam generator may be formed by tubings carrying a coolant and welded in gastight manner by connecting bridge pieces. The flue gas outlet is indicated at 31. Further ducts leading from this outlet to purge means and eventually to the stack are conventional and not shown in the drawings.

Within the first combustion duct 1 there is formed a secondary combustion chamber 4 which is in the form of a heat radiation space. Above this combustion chamber 4 secondary heating surfaces are provided. The heating surfaces, in the direction of flow of the combustion gas, consist of a second superheater 5, a primary air preheater 6 in the form of a tubing, a first superheater 7 and a second feed water preheater 8. The flue gas at the place of impact on the primary air heater is therefore still at the high temperature necessary for a sufficient heating up of the primary air.

A second portion 3 of the combustion chamber is separated into two parallel sections by a partition which extends in the direction of flow of the combustion gas. In one of these sections there is provided a preheater 9 for the secondary air and in the other section there is arranged a preheater 10 for the tertiary air. Both preheaters are adapted for heating by means of the combustion gas in the form of rotary regenerative storage heat exchangers. While the combustion air thus directly contacts the preheater for the secondary air, a feed water preheater 11 is provided in the right-hand section of the combustion channel ahead of the preheater 10 for the tertiary air so that the flue gas is being cooled down to the lower temperature required for the tertiary air.

The secondary combustion chamber 4 in the first combustion duct 1 is connected to a prearranged vertically extending preliminary combustion chamber 12. The combustion chamber 12 is provided with ceiling burners 13 which may, however, also be in the form of horizontal burners. As its outlet portion into the main or secondary combustion chamber it may have a nozzle-like contraction 14. The walls of the preliminary combustion chamber 12 consist of tubes subjected to cooling. They may have studs over all or part of the surface or may be cladded with a refractory lining.

The coal is introduced from a supply bin 15 to a rod mill 16 in which it is comminuted and at the same time dried by means of flue gases which are obtained by suction from the combustion chamber by means of a flue gas duct 17. Instead of the rod mill 16 there may also be used other devices suited for grind-drying of coal such as a roller mill.

The mixture discharged from the rod mill 16 and consisting of vapors and coal dust is first passed into a classifier 18 and then into a dust separator 19. The coal dust separated in the separator is then passed into a coal dust bin 20 while the vapors generated in the separator are removed by the suction of a mill fan 21 and are added to the stream of coal either prior or subsequent to the rod mill 16. The flow of vapors may furthermore totally or partly pass to a hose- or electrofilter 22 to effect further elimination of coal dust. A filter fan 23 then passes the vapors from the filter 22 to the vapor burners 24 which are provided in the secondary combustion chamber 4.

As for the combustion air this is obtained by means of an open air suction device which passes the combustion air to the secondary air preheater 9 and the tertiary air preheater 10 which are arranged in parallel. In the secondary air preheater 9 the combustion air is heated to a temperature of 350° to 400° C. A portion of the combustion air obtained from the secondary air preheater 9 is passed as secondary air into the preliminary combustion chamber 12. A blower 26 which builds up pressure passes the other portion of the combustion air which has already been heated to 350° to 400° C. in the preheater 9 to a primary air preheater 6 which is arranged between two intermediate super heaters 5 and 7. In the primary preheater this part of the combustion air is heated to 500° to 600° C. or higher. This superheated combustion air then forms the primary air and is fed together with the coal dust into the burners 13 of the preliminary combustion chamber 12.

In the tertiary air preheater 10 the combustion air is heated to a temperature of 250° to 300° C. and is introduced as tertiary air into the preliminary combustion chamber 12 at the area of the contraction 14.

As will appear in the embodiment of FIG. 1 which is the preferred form of the invention the carrier for the coal dust is totally constituted by the primary air. It is, however, possible to make use as carrier air also of air obtained from the secondary air duct or tertiary air duct as illustrated in FIGS. 2 and 3.

Figure 2:
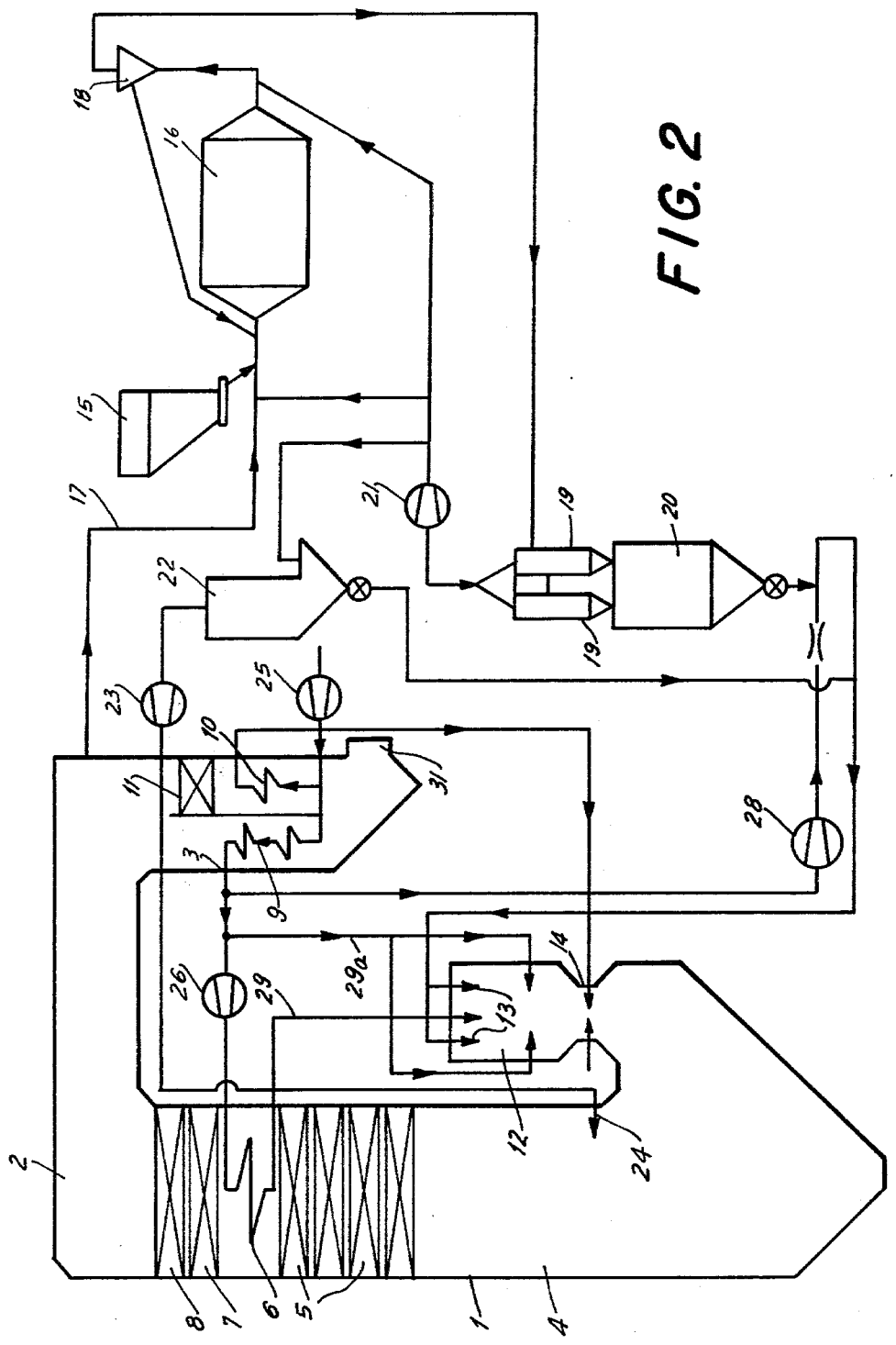
FIG. 2 illustrates an embodiment where the carrier air is obtained out of the secondary air duct.
Figure 3:
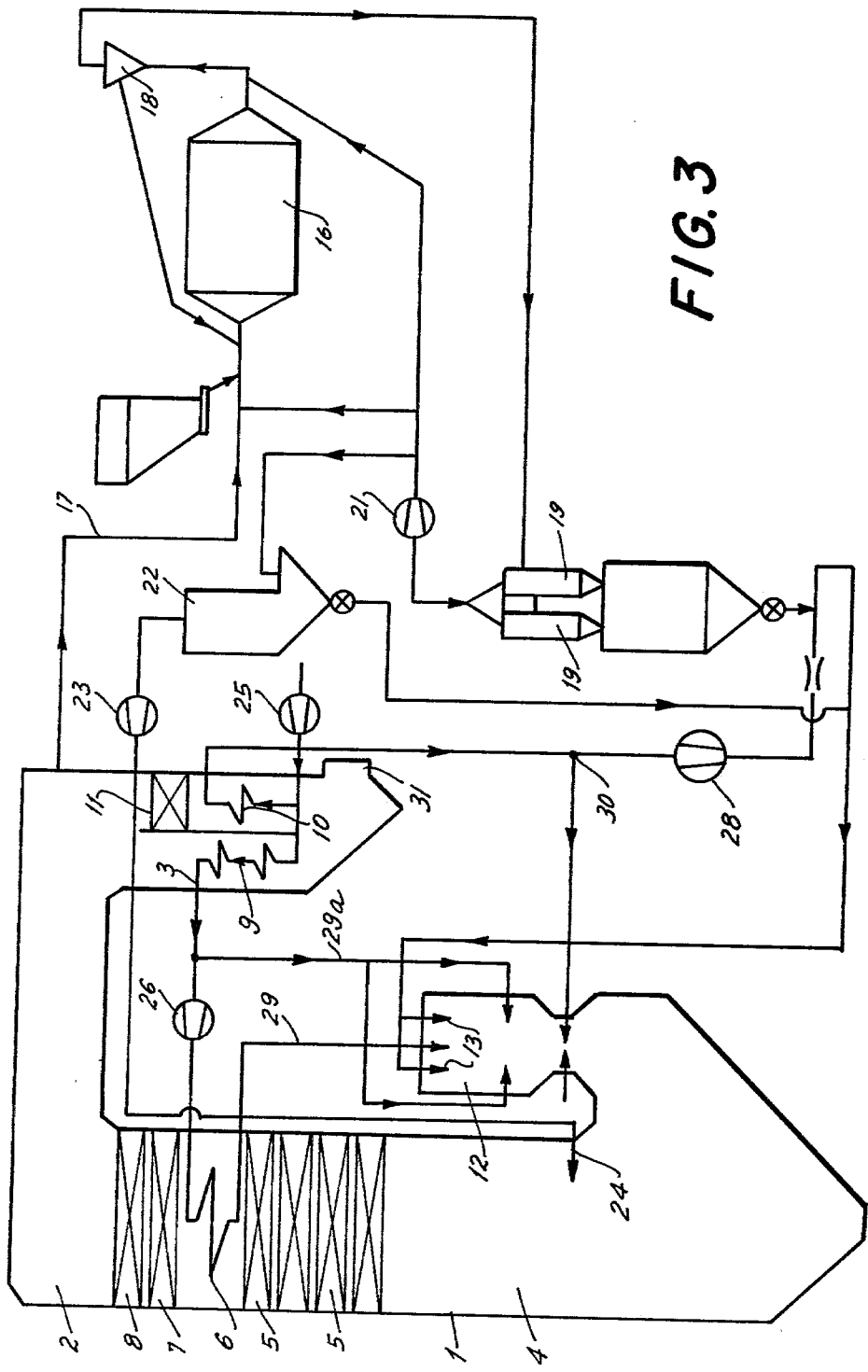
FIG. 3 is similar but the carrier air is obtained out of the tertiary air duct.

With reference to FIG. 2, in this embodiment the carrier air is obtained from the secondary air duct. The carrier air is passed from the branch point 27 through a duct to an additional blower 28 in which its pressure is increased. It is then charged as appears from the figure with coal dust from the coal bin 20 and is further passed into the burners 13. The primary air on the other hand is separately blown, after being heated to the required temperature, through duct 29 into the combustion chamber.

As will be indicated further in the examples below the amount of secondary air may be about 30% and the amount of carrier air about 15%. The total air introduced at the intermediate temperature range of 350° to 400° C. is accordingly about 45%.

Now referring to Example 3, this embodiment illustrates a case where the carrier air for the coal dust is obtained from the tertiary air duct. The carrier air in this case is taken from a branch point 30 out of the air duct for the tertiary air. While the tertiary air as in FIG. 1 is passed into the contraction 14 of the firebox the portion of the tertiary air withdrawn from the general flow of tertiary air is passed to a blower 28 for increase of its pressure. It is then again charged with coal dust.

taken from the bin 20, and passed directly into the burners 13.

The primary air and the secondary air are thus blown into the combustion chamber after the necessary heating without being charged with coal dust, see the ducts 29 and 29a.

As will be further specified in the examples below, the amount of secondary air in this embodiment of FIG. 3 may be about 40%. The tertiary air introduced as such in the combustion chamber should be about 25% while the carrier air should comprise about 15%. In other words, the total amount of air introduced at the relatively low temperature range of 250° to 300° C. would be about 40%.

By suitable throttles in the ducts of the combustion air the respective combustion air can thus be divided into directly introduced combustion air and carrier air for the coal dust. Thus, for instance the air introduced at the intermediate temperature as secondary air may comprise about 50% and the tertiary air, that is the air introduced at the comparatively low temperature of 250° to 300° C. may comprise about 35 to 40% of the total combustion air.

The following examples which give specific figures further illustrate the different divisions between the several portions of the combustion air and the carrier air as illustrated in the three figures of the drawings.

EXAMPLE I

Primary air: 15% at 550° C.
Secondary air: 50% at 400° C.
Tertiary air: 35–40% at 275° C.

EXAMPLE II

Primary air: 20% at 550° C.
Carrier air: 15% at 400° C.
Secondary air: 30% at 400° C.
Tertiary air: 35% at 275° C.

EXAMPLE III

Primary air: 20% at 550° C.
Carrier air: 15% at 275° C.
Secondary air: 40–50% at 400° C.
Tertiary air: 25% at 275° C.

All amounts given are approximate figures and may therefore not add up to exactly 100%. See also the remarks in the preceding discussion.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A process for operating a firebox with comminuted solid fuel having poor kindling properties and low volatile gas contents, the said process comprising
introducing into the firebox the combustion air in at least three separate batches at three successive places as primary, secondary, tertiary, etc. air, the primary air having a temperature of about 500° to 600° C. and compacting a relatively minor amount of the total combustion air, the secondary air having a temperature of about 350° to 400° C., and the tertiary air having a temperature of about 250° to 300° C.,
the fuel being introduced in pulverized form together with the carrier air constituted by the primary air or derived from the secondary or tertiary air,
and withdrawing the ash as a dry discharge.

2. The process of claim 1 wherein the primary air serves as the carrier air for the fuel and effects a pregasification of the fuel whereupon the secondary air starts the combustion of the pregasified fuel and the tertiary air completes the combustion.

3. The process of claim 1 wherein the carrier air for the fuel is derived from the secondary air.

4. The process of claim 1 wherein the carrier air for the fuel is derived from the tertiary air.

5. The process of claim 1 wherein the pulverized fuel is constituted by coal dust.

6. The process of claim 1 wherein the amount of the primary air comprises about 15 to 20% of the total combustion air.

7. The process of claim 1 wherein the amount of air introduced at 350° to 400° C. comprises about 40 to 50% of the total combustion air.

8. The process of claim 1 wherein the amount of air introduced at the range of 250° to 300° C. comprises about 35 to 40% of the total combustion air.

9. The process of claim 1 wherein the initial combustion is effected in a preliminary combustion chamber and wherein the primary air is introduced into burners provided in said chamber prior to the entry of the combustion gas into the main compartment of the combustion chamber.

10. The process of claim 9 wherein the secondary air and the tertiary air are introduced at successive places at the area of transition from the preliminary combustion chamber to the main combustion chamber.

11. The process of claim 1 wherein the fuel is introduced in the form of compacted coal and is pulverized thereafter, whereupon the formed coal dust is separated from the vapor generated during the pulverization and the vapors are passed to additional burners provided in the main combustion chamber.

12. An apparatus for operating a firebox with solid gasifiable fuel having poor kindling properties and a low volatile gas contents, the said apparatus comprising
inlet means for introducing combustion air under pressure into the apparatus;
a plurality of separated heater sets for separate portions of said combustion air;
duct means for passing a first part of the combustion air into a first of said heater sets and for passing a part of the combustion air into a second of said heater sets so that the two portions form a secondary and a tertiary combustion air for the operation of the apparatus and the first heater providing a temperature higher than that provided in the second heater set;
duct means for passing a portion of said secondary air into a third heater set where said portion of air is heated to a temperature still higher than that of the secondary air, this portion then forming the primary combustion air in the operation of the apparatus;
a combustion chamber;
a set of burners provided in said combustion chamber;
duct means for passing the said primary air into said burners;
duct means for passing the secondary and tertiary air at successive places into said combustion chamber separate from and following the said burners in the direction of flow of the combustion air;

and means for introducing a pulverized solid fuel into said burners together with and suspended in at least part of said combustion air.

13. The apparatus of claim 12 wherein the means for introducing the pulverized fuel lead into said primary air duct, the latter thus constituting the carrier air for the fuel.

14. The apparatus of claim 12 wherein a branched-off duct is provided from the duct means for said secondary air and wherein the means for introducing the pulverized solid fuel lead into said branch of the secondary air duct whereupon the secondary air portion in said brached-off duct forms the carrier air for the fuel leading the fuel into said burners.

15. The apparatus of claim 12 wherein a branched-off duct is provided from said duct means for the tertiary air and wherein said branched-off duct leads to a point wherein the means for introducing the pulverized solid fuel merge into said duct whereupon the said branched-off duct leads into said burners, the said tertiary air thus constituting the carrier air for the fuel.

16. The apparatus of claim 12 including a feed opening for a compacted solid fuel; means for pulverizing said compacted fuel; a separator for separating the pulverized fuel dust from the vapors generated in said separator and duct means for passing at least part of said vapors into said combustion chamber.

17. The apparatus of claim 16 comprising an additional set of burners at a place subsequent to said first set of burners and subsequent to the inlets for introduction of the secondary and tertiary air, the duct means for said vapors leading into said additional set of burners.

18. The apparatus of claim 12 wherein the combustion chamber includes a prearranged subsection forming a preliminary combustion chamber, the said burners being disposed in said preliminary combustion chamber and the said tertiary air being introduced at the area of transition from the preliminary combustion chamber to the secondary combustion chamber.

19. The apparatus of claim 18 wherein the preliminary combustion chamber is disposed vertically and the said burners are disposed vertically from its ceiling or in horizontal position.

20. The apparatus of claim 18 wherein the preliminary combustion chamber is formed with a contraction in said transition area and wherein the inlet for the tertiary air is at the place of said transition area.

21. The apparatus of claim 18 wherein the heater for the primary air is disposed in the main combustion chamber in the course of flow of the flue gas at a place where the flue gas is still sufficiently hot to heat the primary air to a temperature of or above 500° C.

* * * * *